United States Patent [19]

Beun

[11] 3,940,737

[45] Feb. 24, 1976

[54] METHOD OF AND DEVICE FOR SKELETONIZING CHARACTERS

[75] Inventor: Matthijs Beun, Eindhoven, Netherlands

[73] Assignee: U.S. Philips Corporation, New York, N.Y.

[22] Filed: Jan. 22, 1973

[21] Appl. No.: 325,880

[30] Foreign Application Priority Data
Jan. 28, 1972 Netherlands.................... 7201225

[52] U.S. Cl................ 340/146.3 H; 340/146.3 MA
[51] Int. Cl.² ......................................... G06K 9/12
[58] Field of Search........ 340/146.3 AG, 146.3 MA, 340/146.3 H, 146.3 R, 146.3 AE

[56] References Cited
UNITED STATES PATENTS

| | | | |
|---|---|---|---|
| 3,106,699 | 10/1963 | Kamentsky ................ | 340/146.3 H |
| 3,339,179 | 8/1967 | Shelton, Jr. et al........ | 340/146.3 H |
| 3,706,071 | 12/1972 | Gray....................... | 340/146.3 MA |
| 3,735,349 | 5/1973 | Beun et al................. | 340/146.3 H |
| 3,766,520 | 10/1973 | Patterson................. | 340/146.3 AE |

OTHER PUBLICATIONS

Bomba, "Alpha-Numeric Char. Rec. Using Local Operations," 1959 *Proc. of Eastern Joint Computer Conference*, pp. 218–224.
McCormick, "Illiac III," *IEEE Transactions on Electronic Computers*, Vol. EC–12, No. 5, Dec., 1963 pp. 800–804.

*Primary Examiner*—Leo H. Boudreau
*Attorney, Agent, or Firm*—Frank R. Trifari; Daniel R. McGlynn

[57] ABSTRACT

Characters are skeletonized to form skeleton characters consisting of single series of character positions. A skeletonizing cycle consists of one mark scanning operation, followed by two peeling scanning operations. The criteria for marking and peeling can be better adapted to each other in this manner. Skeletonizing, thus, is rendered substantially independent of the sequence in which the character positions are treated, so that notably the symmetry of the character elements remains the same. Moreover, the occurrence of random tails can be avoided to a substantial degree.

5 Claims, 28 Drawing Figures

METHOD OF AND DEVICE FOR SKELETONIZING CHARACTERS

The invention relates to a method of skeletonizing characters which are applied in a two-dimensional regular pattern of positions in this method. A character position is distinguished from a background position by digital information present, the characters being skeletonized in order to isolate superfluous information. Thus, the information of a character position is changed into that of a background position until a skeleton character is obtained whose line elements consist of single series of character positions which succeed each other in accordance with an adjacency criterion. The skeletonizing is performed in cycles, the positions of the character field being treated during a cycle in a regular and fixed sequence. Character positions which are situated at an edge of the character in accordance with an edge criterion are marked in a first sub-cycle of a cycle by associating additional information with the information of those character positions. A method of this kind has been described in U.S. Pat. No. 3,339,179 (G. L. Shelton). There character positions are marked in a number of cycles by adding a sum thereto. The sum is formed according to a method resembling autocorrelation; it increases in each cycle. In a number of subsequent cycles the character positions whose sums are between given limits are tested against an indispensability criterion. It was found that in this manner less favourable results are often obtained. The invention relates to an improved system in which the marking is performed during a first sub-cycle of each cycle. Furthermore, according to this patent skeletonizing is so rigorous that characteristic elements of the characters can readily disappear: FIG. 3 of the patent shows an example of a skeletonized capital letter "F". On the one hand, the cross-stroke half-way the upright stroke has substantially completely lost the characteristic seriph at its end. On the other hand, superfluous character positions remain.

Consequently, it appears that less rigorous skeletonizing is desirable on the one hand. It was found that in that case short projecting line elements can readily appear. These can be the remainder of a seriph in the original character. However, even if there was no seriph, they can arise "spontaneously" as it were. If they do not correspond to characteristics (for example, a projection) of the original character, they should have to be removed. It has been proposed to remove these projections after skeletonizing, but other problems arise: the method is then liable to remove the wrong short projecting line elements. It is an object of the invention to avoid the occurence of such projections.

According to the invention character positions are tested successively first in a second sub-cycle against a first indispensability criterion, on the basis of which they are either removed or maintained. The maintained marked character positions are subsequently tested in a third sub-cycle against a second indispensability criterion on the basis of which they are either removed or maintained. The character positions which were removed in the second sub-cycle appearing as background positions in the third sub-cycle. The first indispensability criterion and the second indispensability criterion can be adapted to each other. The appearance of such short projecting line elements can thus be avoided without skeletonizing being too rigorous.

The indispensability criterion as used in said U.S. Pat. No. 3,339,179 maintains character positions which would cause an interruption or a loop in the character if they were removed. A summarizing criterion is the "order" of a character position. This is defined as the "multiplicity" (number of times) according to which a character position adjoins a number of groups of character positions which together form a continuous pattern. This "multiplicity" can be single, dual, etc. A circle is made along the positions neighbouring a character position, and the number of times the sequence of character positions is interrupted is determined. This number then is the order of the central character position. Removal does not produce a loop or interruption only if the order is one. Examples thereof will be described.

The projecting line elements start at an end point. Consequently, the appearance of end points must remain well under control. They arise in three ways:

a. During a cycle a character position does not satisfy the edge criterion, so it is not marked during the first sub-cycle (mark sensing). During the second and the third sub-cycle (peeling sensing) it loses so many marked neighbours (not satisfying the indispensibility criterion during these sub-cycles) that it becomes an end point. It may be that it has only one neighbouring character position left, or two positions which adjoin each other again.

b. During a sub-cycle (peeling sensing) a marked character position loses a number of neighbouring character positions. When it is its own turn to be tested against an indispensability criterion, it appears to form an end point.

c. A marked character position is first tested against an indispensability criterion during a sub-cycle. It appears to be indispensable (for example, because its order is not equal to one). Subsequently, neighbouring marked character positions are tested against the indispensability criterion and are removed. At the end of this sub-cycle it appears that the maintained character position forms an end point.

The cases (b) and (c) do not necessarily give end points of characteristic line elements which are necessary for recognition. This will often not be the case. Assume that marked end points are not indispensable. If the character position which is maintained in case (c) is again tested against the latter indispensability criterion, then it will be removed. Furthermore, which of the character positions are removed often depends on the sequence in which the character positions are tested. This is less likely with the method according to the invention.

In a further embodiment of the invention only the marked character positions are maintained whose removal would cause an interruption or a loop in the character on the basis of the first indispensability criterion. On the basis of the second indispensability criterion only the character positions are maintained which project from the character in the way of an end point (tail point) being removed. It was found that such a method offers favourable results. In the second sub-cycle many character positions are tested, and a substantial percentage thereof are removed. In the third cycle end points which become apparent are removed from developing, projecting line elements.

In a still further embodiment of the invention the cycles are preceded by a smoothing cycle in which character positions which project from the character in accordance with a smoothing criterion are removed. Background positions which project into the character are changed into character positions whereby character positions which project from the character in accordance with a projection criterion are excluded from marking in the subsequent cycles. This combination was found to offer favourable results. Notably the character positions according to the above case (a) are maintained. These character positions substantially always form end points of characteristic line elements of the skeleton character.

The invention also relates to a device to be used for skeletonizing characters. The characters are applied on a carrier, comprising a detector which images the information of the character on a provided storage device. The characters then are stored as digital information of character positions and background positions respectively, which positions are arranged on the carrier in accordance with a two-dimensional regular pattern of positions. Furthermore a skeletonizing device is included to which at least the information of character positions can be applied and by which the information of character positions can be changed into that of background positions until the information of character positions stored in the said storage device has been reduced to the information of character positions of skeleton characters whose line elements consist of single series of character positions which succeed each other in accordance with an adjacency criterion. Skeletonizing is controlled in cycles by a control unit, it being possible to apply information of the positions of the character field in a regular and fixed sequence to the skeletonizing device during a cycle. It is also possible in a first subcycle of a cycle to apply at least the information of the character positions, together with the information of the positions neighbouring these character positions, to a first decision unit in which an edge criterion is incorporated, the first decision unit adds additional information to the information of the character positions for which the said edge criterion has been satisfied. The detector can consist of a flying spot scanner, and the storage device can be composed of a matrix of bistable elements. As a result of skeletonizing, the rendundancy is reduced and recognition is faciliated. The skeletonizing is performed advantageously because in a subsequent second sub-cycle the information of the character positions can be applied, together with the additional information, to a second decision unit in which a first indispensability criterion is incorporated and by which, if the edge criterion was satisfied but the first indispensability criterion was not satisfied, the information of the relevant character position can be changed into that of a background position. It is possible in a subsequent third sub-cycle to apply the information of the remaining character positions, together with said additional information, to a third decision unit in which a second indispensability criterion is incorporated and by which, if the edge criterion was satisfied but the second indispensability criterion was not satisfied, the information of the relevant character position can be changed into that of a background position, after which this changed or unchanged information appears on an output. The construction of the second and the third decision unit can be the same, or different. If they are identical, it is even possible that the second and third decision unit are the same unit which is passed through twice.

The invention will be described with reference to the drawing in which.

Figure 1:
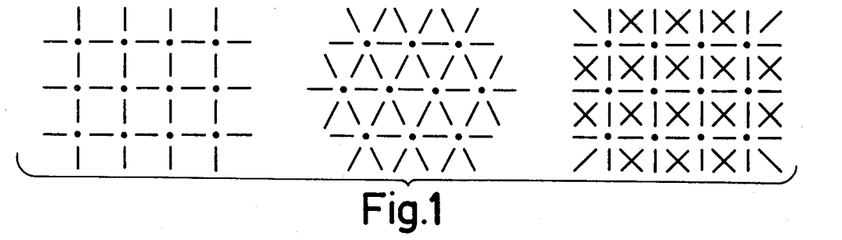
FIG. 1 shows some commonly used patterns of positions.
Figure 2:
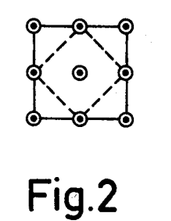
FIGS. 2 – 16 show some examples of the "order"

FIG. 1 shows three commonly used patterns of positions. The positions are denoted by dots. A line indicates in which direction a neighbouring position is situated. The positions thus have 4, 6 and 8 neighbours, respectively.

The FIGS. 2 to 16 show examples of the determination of the order of the central character position. Character positions are denoted by an encircled dot. A number of connections are shown so as to illustrate the complex manner in which the central character position adjoins a number of groups of character positions which mutually form a closed pattern. Broken lines denote connections in the case where a position has eight neighbours; the solid lines apply in the case of four and six neighbours, respectively. The order is now as follows:

| Figure | Neighbours | Order | Neighbours | Order | Neighbours | Order |
|---|---|---|---|---|---|---|
| 2  | 4 | 0 |   |   | 8 | 0 |
| 3  |   |   | 6 | 0 |   |   |
| 4  |   |   | 6 | * |   |   |
| 5  | 4 | 1 |   |   | 8 | 0 |
| 6  |   |   | 6 | 1 |   |   |
| 7  | 4 | * |   |   | 8 | 1 |
| 8  | 4 | 1 |   |   | 8 | 1 |
| 9  | 4 | 1 |   |   | 8 | 1 |
| 10 |   |   | 6 | 2 |   |   |
| 11 | 4 | 1 |   |   | 8 | 3 |
| 12 | 4 | 2 |   |   | 8 | 3 |
| 13 | 4 | * |   |   | 8 | 4 |
| 14 |   |   | 6 | 3 |   |   |
| 15 | 4 | 1 |   |   | 8 | 2 |
| 16 | 4 | 0 |   |   | 8 | 4 |

Figure 3:
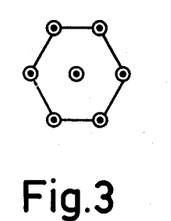
Figure 4:
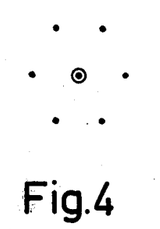
Figure 5:
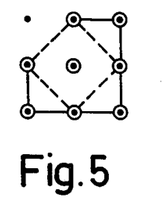
Figure 6:
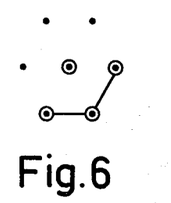
Figure 7:
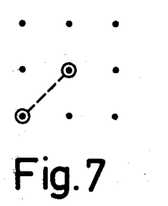
Figure 8:
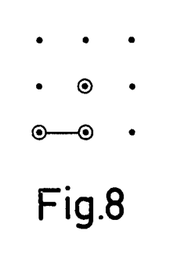
Figure 9:
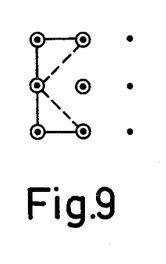
Figure 10:
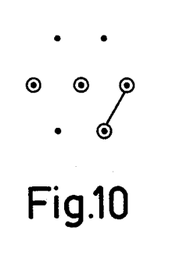
Figure 11:
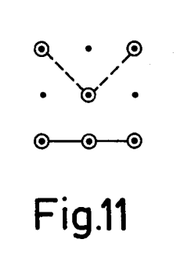
Figure 12:
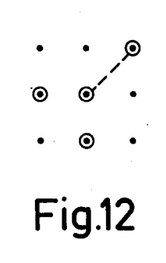
Figure 13:
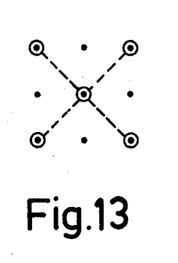
Figure 14:
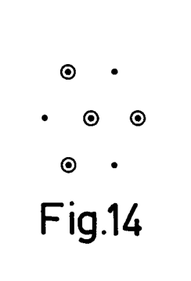
Figure 15:
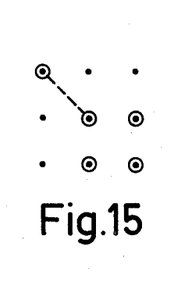
Figure 16:
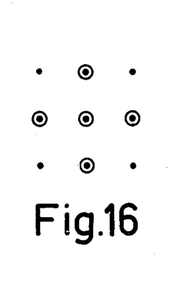

The cases denoted by an asterisk refer to isolated character positions. These cases may be detected separately. FIG. 3 shows the order zero, and a loop would arise if this character position were removed. The order appears to be dependent of the number of neighbours taken into account. The positions neighbouring the central character position form a so-termed ring, and the order can also be denoted as the number of times that this ring is interrupted.

Figure 17:
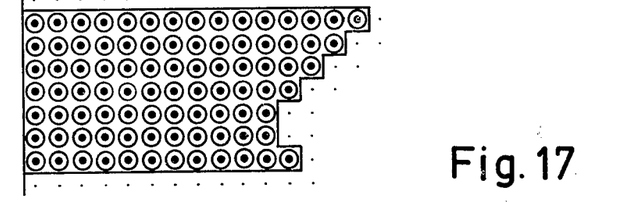
FIGS. 17 – 21 show an example of skeletonizing according to an older technique.

FIGS. 17 to 21 show an example of the skeletonizing operation which is described in U.S. application Ser. No. 369,201, filed June 12, 1973, which is a continuation of application Ser. No. 196,937, filed Nov. 9, 1971 now abandoned, and also in U.S. Pat. No. 3,735,349. FIG. 17 shows a character element projecting to the right, for example, a horizontal bar of a captial letter F. Character positions are denoted by an encircled dot, background positions by a dot. The part of the character which is situated to the left of the vertical line is not taken into consideration. The edge criterion is as follows: a 3×3 matrix is considered. If the first column thereof has at the most one character position, and the remainder (including the central character position) has at least three, the central character position is marked. A corresponding criterion is applicable in the three other orientations. A marked character position then has at least two neighbours; this appears to give rise to rigourous skeletonizing.

The marked character positions are subsequently tested against an indispensability criterion, one line after the other from left to right. The indispensability criterion is: if removal were to give rise to an interruption (or a loop, but this is not applicable due to the choice of the edge criterion), the character position is maintained. For this purpose all eight outer positions of the 3×3 matrix are considered to be neighbours of the central character position.

Figure 18:
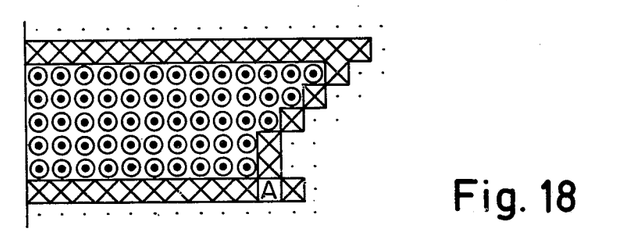
Figure 19:
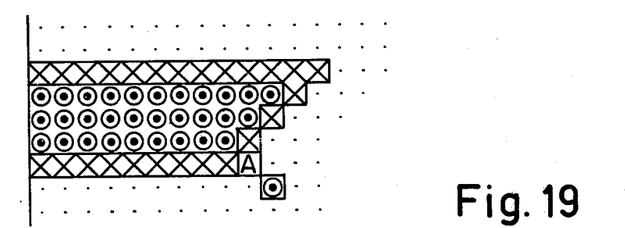
Figure 20:
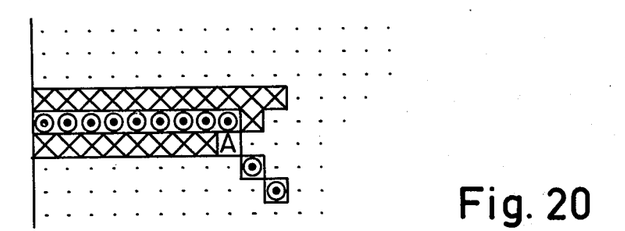
Figure 21:
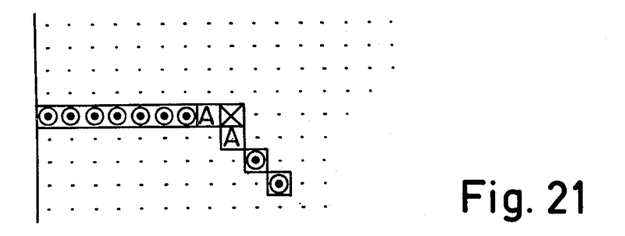

FIG. 18 shows which character positions were tested against an indispensability criterion: the character positions which could be removed are denoted by a cross. The letter A indicates that the relevant position was maintained: at the instant of testing, the character position at the lower right was still present, i.e. removal would have caused an interruption. The character position which is denoted by an A in FIG. 18 is no longer evaluated in subsequent cycles because it has only one neighbour. It thus forms a permanent end point. In FIGS. 19, 20, 21 the respective character positions denoted by A are maintained because removal would cause an interruption. FIG. 21 shows the ultimate result: the symmetry has been radically changed. FIG. 17 shows a tendency towards the upper right. In FIG. 21 the tendency is stronger and towards the bottom right.

Figure 22:
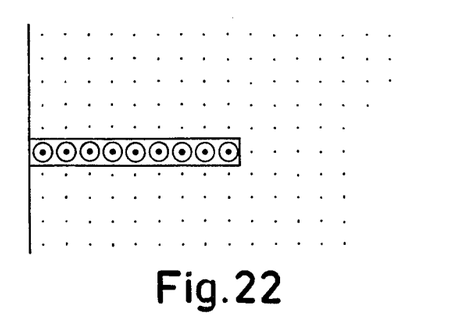
FIG. 22 shows an example of a skeletonizing result according to the present invention.

Improved skeletonizing is achieved according to the invention by testing the character position denoted by A in FIG. 18 again as regard indispensability. Removal does not result in an interruption, and if the second indispensability criterion is the same as the first, it may be removed. In the subsequent cyles the character positions denoted by an A in FIGS. 19 – 21 do not satisfy the indispensability criterion, so they are removed. The result of FIG. 22 is thus obtained. Consequently, by testing at least twice against an indispensability criterion in a first cycle, improved skeletonizing was achieved. It may also be that the improvement arises in that in a second etc. cycle testing against an indispensability criterion is performed twice. Due to the double testing, the end points of many projecting line elements which do not form a characteristic of the character are removed upon appearance. In this manner, development of these line elements is prevented. In the example the two indispensability criterions were identically formulated, but this is not necessary. They can even differ from cycle to cycle. An additional advantage of the method of double testing against indispensability criteria is that these criteria may be less severe. This is because if such points are maintained the first time, they are tested once more any way. The criterion for marking may be less severe for the same reasons.

Figure 23:
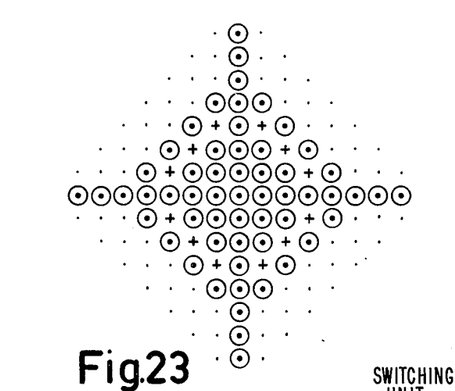
FIGS. 23 – 24 demonstrate the usefulness of a smoothing cycle.
Figure 24:
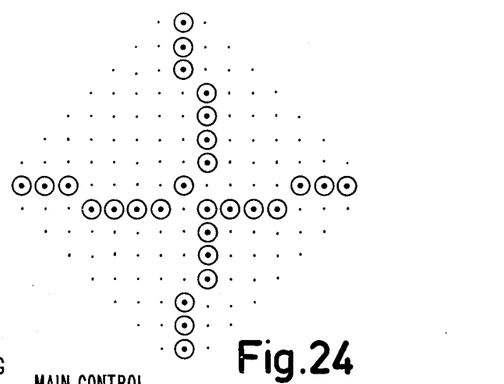

FIG. 23 shows a case illustrating the usefulness of a smoothing cycle for the case of eight neighbours. This Figure is immune to skeletonizing. Removal of a character position will always cause a loop or an interruption. It is assumed that the four ends are not marked. Assume the smoothing criterion to be: a background position having more than four adjoining character positions is filled. The result is shown in FIG. 24 which gives a simple configuration. The filling of background positions can be limited to cases where none of the vertical or horizontal neighbours is a background position. The latter neighbours can generally be allotted more significance than the others, for example, by incorporating weighting factors in the criteria. This smoothing offers favourable results, particularly in combination with the double testing of marked character positions against an indispensability criterion. This becomes apparent if of a large number of characters applied, for example $10^5$, a larger percentage is recognized correctly. The example has been elaborated for eight neighbours per position. Analogous treatments are applicable to positions with four or six neighbours.

A device for testing against an indispensability cirterion is described in U.S. application Ser. No. 369,201 and U.S. Pat. No. 3,735,349. FIGS. 7 to 12 of that application and patent illustrate such a device, i.e., FIG. 7 a block diagram, FIG. 8 a more detailed block diagram, FIG. 9 a main store, FIG. 10 a marking store with a circuit for marking, FIG. 12 a circuit for testing against an indispensability criterion by means of the gates Y4-15 (no interruption should arise), and FIG. 11 a skeletonizing store, a mark store, and a circuit which generates an other indispensability criterion which will not be discussed in this context. Using the device as described in that application and U.S. Pat. No. 3,735,349, character positions can be tested twice against an indispensability criterion. This is effected, if, for example, in a first cycle a character position is found to satisfy an edge criterion but appears to be indispensable, and satisfies an edge criterion again in a second cycle. The device described in that application and patent can be extended such that the information of all positions circulates twice per cycle, while the mark store (FIG. 11 of that application and patent) is extended such that it can contain any additional information of all marked character positions. As a result, the store would be substantially expanded, i.e. it would become approximately as large as the main store, for example, $32 \times 32 = 2^{10}$ bits. Moreover, the completion of a cycle requires about twice as much time as required in that application and patent.

Figure 25:
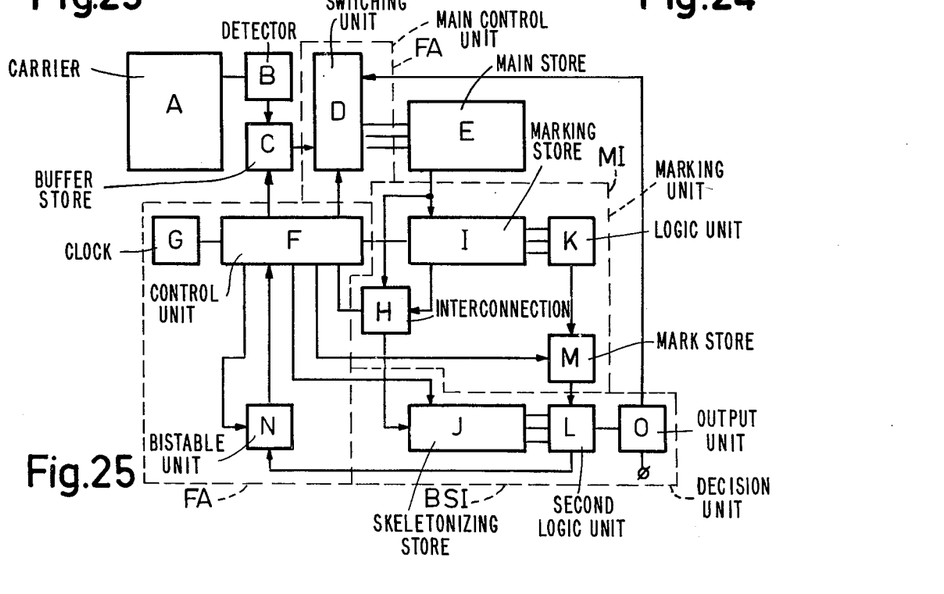
FIG. 25 shows a diagram of a device according to the invention.

FIG. 25 of the present application, derived from U.S. application Ser. No. 369,201 and U.S. Pat. No. 3,735,349, shows a device for performing the method according to the invention, and comprises a carrier A with characters, a detector B, a buffer store C, a switching unit D, a main store E, a control unit F, a clock G, an interconnection unit H, a marking store I, a skeletonizing store J, a logic unit K, a second logic unit L, a mark store M, a bistable unit N, and an output unit O. Broken lines denote which parts form part of a main control unit FA, a marking unit MI, and a decision unit BSI. The characters are printed in a contrasting ink on the carrier A. The detector is a flying spot scanner which scans the character one line after the other. The buffer store C is a shift register of, for example, 32 bits. The information of a line of the character is stored therein: the most simple form is one bit per position, i.e. giving the information "occupied" or "empty". The main store E can also be constructed as a shift register. The clock G applies clock pulses at regular instants to the control unit F which controls the further course of events. The buffer store C is used for adapting the properties of the detector B and the main store E to each other. After a line of the character has been scanned, the information of this line is transported via the switching unit D under the control of the control unit F. The character consists of, for example, 32 lines of 32 bits. When all information of the character has been stored in the main store E, skeletonizing commences. To this end, a circuit is formed by a loop connection of the main store E, the marking store I, the skeletonizing store J, the logic unit L and the output unit O. All stores can be constructed as shift registers. Under the control of the clock pulses and the control unit F, the information formation of the characer circulates until it has returned to the main store E. During this circulation, the character positions are marked or are not marked in the marking store I in accordance with an edge criterion which compares the information of a character position with the fact whether or not the neighbouring positions are occupied. This is effected by the logic unit K, the information whether or not the relevant character position is marked being applied to the mark store M. The output of the marking store I is connected, via the interconnection unit H, to the input of the skeletonizing store J. The information of marked character positions therein is compared with that of the neighbouring positions. In this manner an indispensability criterion is implemented: the mark of the character position under consideration, and possibly that of other character positions, is applied to the second logic unit L by the processing store M. This second logic unit L tests against a first indispensability criterion and decides whether or not the marked character position may be removed. If the marked character position may be removed, its information is changed into that of a background position. According to the present invention, this second logic unit L then tests against a second indispensability criterion, however, not until the first testing has progressed so far that the results thereof can no longer influence the second test. The information of the removed or nonremoved character returns, via the output unit O, to the main store E and becomes available, if desired, on an output terminal of the output unit O. If no character position is removed during a cycle, skeletonizing is stopped. This is detected by the bistable unit N which receives the removed signals. If desired, one or more cycles of an other type can still follow. The sub-cycles, consequently, are not separated in time; however, the character positions are first subjected to the first, then to the second, and finally to the third sub-cycle.

Figure 26:
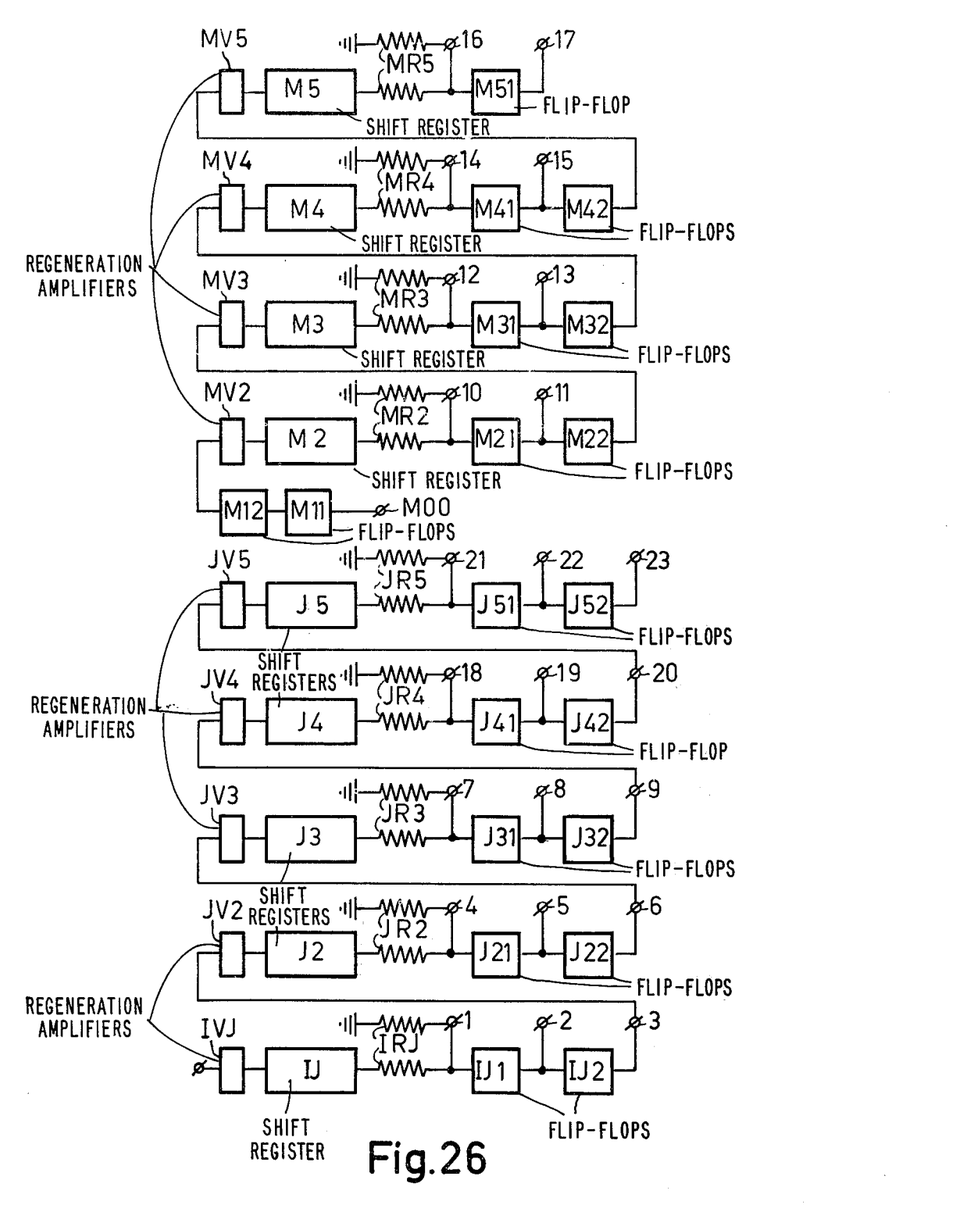
FIG. 26 shows a skeletonizing store and a processing store.

FIG. 26 shows a skeletonizing store and a mark store. The character field consists of, for example, 32 × 32 positions, the information of which is stored each time as one bit per position.

The skeletonizing store comprises five 30-bit shift registers IJ, J2, J3, J4 and J5 with terminating resistors LRJ, JR2, JR3, JR4 and JR5, and regeneration amplifiers IVJ, JV2, JV3, JV4 and JV5. The skeletonizing store furthermore comprises ten flipflops IJ1, IJ2, IJ21, J22, J31, J32, J41, J42, J51 and J52. The information of the last bits of the shift registers and of the flipflops is present on the signal terminals 1 . . . . 9 and 18 . . . . 23. Terminal 23 acts as the signal output terminal. The flipflops J21 and J41 furthermore comprise reset imput which are not shown. FIG. 26 also shows a mark store. This store is constructed in an analogous manner, and comprises a signal input terminal Noo, four 30-bit shift registers M2, M3, M4, M5 with regeneration amplifiers and terminating resistors MV2 . . . . 5 and MR2. . . . 5, nine flipflops M11, I2, 21, 22, 31, 32, 41, 42 and 51, and the signal terminals 10 . . . . 17. Consequently, in the skeletonizing store the information is stored whether or not a position is a character position, the information whether or not this position is marked being stored in the mark store.

Figure 27:
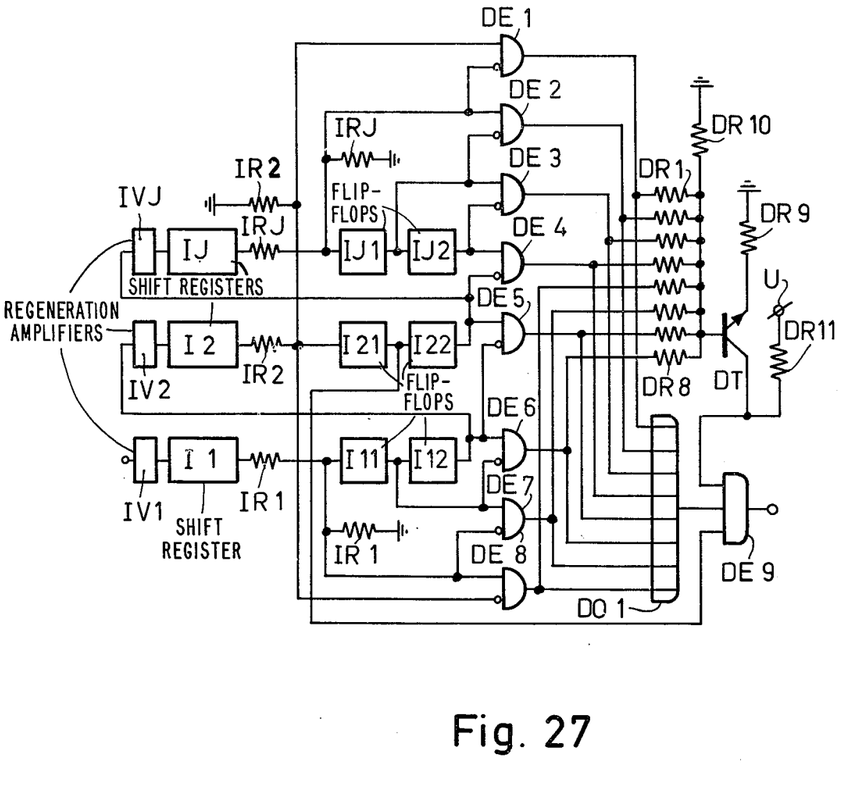
FIG. 27 shows a device for generating an edge criterion.

FIG. 10 of U.S. application Ser. No. 369,201 and U.S. Pat. No. 3,735,349 shows a device in which a character position is tested against an edge criterion. This is analogous to the description given with reference to the present FIGS. 17 . . . . 23. FIG. 27 shows a device which generates an other type of edge criterion. It is again that each position has eight neighbouring positions. This ring of neighbouring positions is followed, and it is counted how many times the character position is directly followed by a background position.

The device according to FIG. 27 comprises three 30-bit shift registers I1, I2 and IJ with adaptation resistors IR1, IR2 and IRJ and regeneration amplifiers IV1, IV2 and IVJ. The device furthermore comprises the flipflops I11, I12, I21, I22, IJ1, IJ2, the logic AND-gates DE1 . . . . 9, the logic OR-gate DO1, eleven resistors DR1 . . . . 11, one transistor DT, and one voltage terminal U. The device forms a marking store and corresponds to that shown in FIG. 10 of U.S. application Ser. No. 369,201 and U.S. Pat. No. 3,735,349. A line comprises 32 positions, so the information of a 3×3 matrix of positions is available on the outputs of the adaptation resistors and the six flipflops. The AND-gates DE1 . . . . 8 receive the non-inverted information of a position and furthermore the inverted information of the next position of the ring about the central character position. If it is found during a round along said ring that a character position is directly followed by a background position, the output of one of the AND-gates DE1 . . . . 8 becomes high. The resultant currents flowing in the resistors DR1 . . . . 8 are added so that the voltage across the resistor DR10 is proportional to the number of times that a character position is directly followed by a background position. If this number is at least equal to one, the output of the OR-gate DO1 also becomes high. If this number is at least two, the transistor DT becomes conductive (the terminal U receives a supply voltage). When the resistor DT is conductive, the input of the AND-gate DE9 which is connected thereto becomes low as a result of the voltage drop across the resistor DR11, so the AND-gate DE9 supplied a high signal only if it is found during a round along a ring about a position that:

a. the central position is a character position;
b. a character position is directly followed by a background position only once.

With reference to FIG. 27 it can also be noted that the order of the central character position can be deteriorated by modifying FIG. 27 as follows (not shown): for this purpose four logic OR-gates DOR1 . . . . 4 are required; these gates receive the input signals from the outputs of: IR2 and IRJ; IJ1 I22 and I12; I11 and IR, respectively. The outputs of the logic OR-gates DOR1 . . . . 4 are then connected to inputs of four logic AND-gates DAND 1 . . . . 4. On their other inputs they receive the inverted signals of the outputs of IJ1; I22; I11; IR2, respectively. The number of these AND-gates supplying a high signal is equal to the order. This number can be determined in the same manner as the number of high signals of the gates DE1 . . . . 8 are counted in FIG. 27: all three inputs of the gate DE9 become high via the OR-gate and the transistor DT only if the order is 1. In the modified device, the base of DT is then connected, via four resistors, to the outputs of the gates DAND 1 . . . 4, as is directly the case with the input of the OR-gate DO1. The gates DE1 . . . 8 can then be omitted, like the superfluous resistors of the series DR1 . . . 8.

The output of the AND-gate DE9 is connected to the input terminal MOO of FIG. 26. In FIG. 12 of U.S. application Ser. No. 369,201 and U.S. Pat. No. 3,735,349 the formation of an indispensability criterion is given: due to the use of the NAND-gates Y4-Y15 the removal of a marked character position is avoided if this would cause an interruption. This can be effected in the same manner in this case: if the output of the logic NAND-gate Y15 becomes high, the character position may not be changed into a background position. In that case the terminals 7, 8, 9, 18, 19, 20, 21, 22, 23 in FIG. 26 replace the terminals 1 . . . 9 with reference to the input signal terminals of the NAND-gates Y4 . . . 15 of U.S. application Ser. No. 369,201 and U.S. Pat. No. 3,735,349 (FIG. 12). The remaining elements of this Figure, notably the NAND-gates Y16 . . . 18, the transistor T5 and the components connected thereto, will not be further described in this context.

Figure 28:
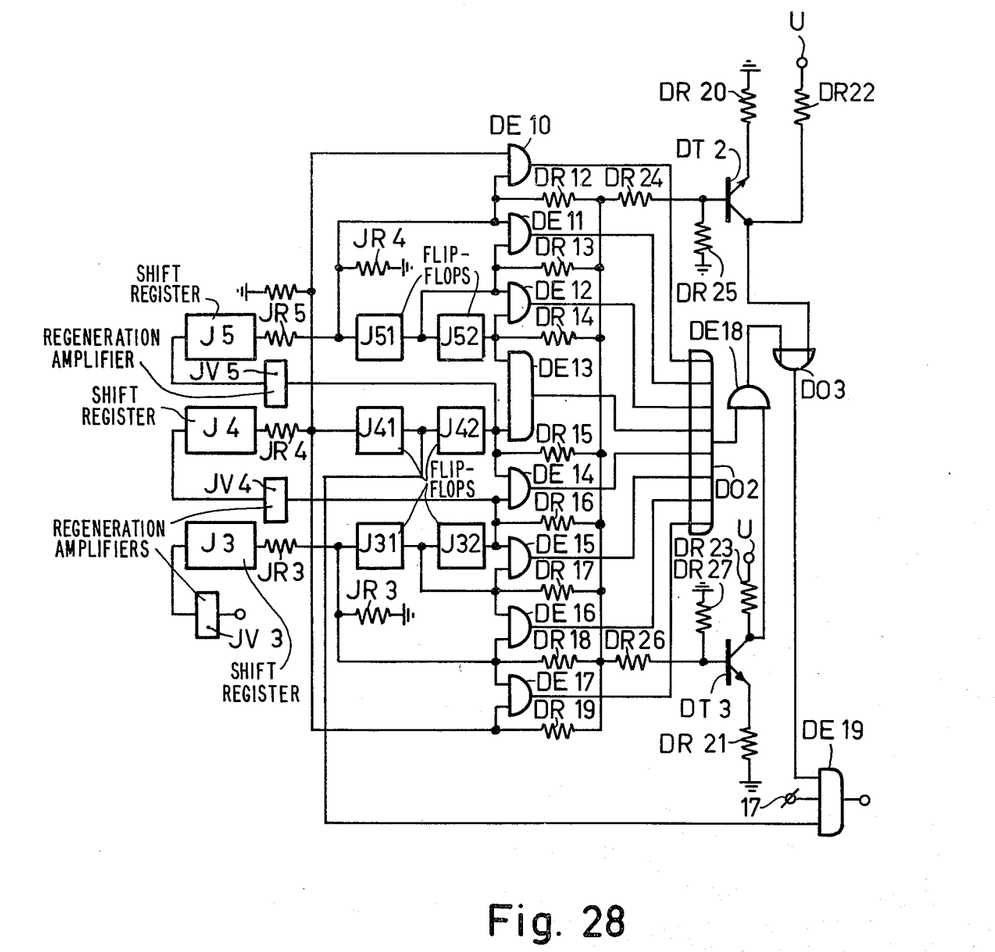
FIG. 28 shows a device for testing marked character positions against an indispensability criterion.

Another possibility is the removal of character positions which project from the character during the second test. A device for this purpose is shown in FIG. 28. Marked character positions are removed if they have only one neighbour or two adjoining neighbours (after removal during the first test of the non-indispensable character positions).

In addition to a number of elements already shown in FIG. 26, the device of FIG. 28 comprises the logic AND-gates DE10-19, the logic OR-gates DO2 and DO3, the transistors DT2 and DT3, the resistors DR12 . . . 27, and a voltage terminal U. If two adjoining positions of a ring about the central position are both character positions, the associated AND-gate of the series DE10 . . . 17 supplies a high signal. If more than one of the positions neighbouring the central position is a character position, the transistor DT2 becomes conductive with the result that the associated input of the OR-gate DO3 becomes low. If there is only one neighbouring character position, and the central position is a marked (terminal 17 of FIG. 27) character position (output of flipflop J41), the AND-gate DE19 supplied a high signal.

If two or more of the positions neighbouring the central position are character positions, the transistor DT3 becomes conductive with the result that the associated input of the AND-gate DE18 becomes low. Consequently, if two character positions neighbour the central character position, if these two positions adjoin each other, and if the central position is a marked character position, the output of the AND-gate DE19 becomes high.

In all cases other than the two said cases the output of the AND-gate DE 19 is low and the central character position (if any) satisfies the indispensability criterion. Under the control of the high signal of DE, the central character position is converted into a background position, for example, by means of a pulse on the reset input of the flipflop J41. The resistors DR 24, 25, 26 and 27 serve to set the transistors DT2 and DT3.

A device of this kind can also be used in a smoothing cycle. In that case, for example, terminal 17 is blocked in reaction to a high signal.

The invention can utilize a variety of criteria. A number of examples is given for eight neighbouring positions:

a. Smoothing criterion for filling:
a background position adjoins at least five character positions;
ditto, provided that it subsequently has the order 1;
a background position would have the order 2 after filling.
Smoothing criterion for removal:
a character position has the order 1 and at the most three neighbouring character positions;
ditto, with the additional requirement that the at the most three neighbouring character positions are arranged in the same row or column.

b. Edge criterion
a row/column in the 3×3 matrix comprises at the most one character position and the remainder at least three (or four);
the "order" of the character position is 1;
the character position adjoins a background position in the horizontal or the vertical direction;
ditto, and has at least three neighbouring character positions.

c. Indispensability criterion
removal may not cause an interruption;
the marked character position may not form part of a block of four marked character positions while the remainder of the 3×3 matrix comprises five background positions;
the order is not equal to one;
the character position has only one neighbour (end point): indispensable.

Corresponding criteria can be composed for other patterns. The list given is not even complete for eight neighbours. Different combinations of the criteria can be formed: for example, the edge criterion, the first and the second indispensability criterion can be adapted to each other. The treatment can also be effected in parallel: the character field can be divided, for example, into two parts and two devices according to the invention can be used. The choice of the criteria can be dependent of, for example, the nature of the characters. It is alternatively possible to use different edge and/or indispensability criteria in different cycles.

What is claimed is:

1. A machine method of skeletonizing characters which are imaged on a two dimensional regular pattern of positions, a character position being distinguished from a background position by digital information being present, the characters being skeletonized for removal of redundant information in that the information of a character position is changed into that of a background position until a skeleton character is obtained whose stroke elements consist of a single series of character positions which succeed each other in accordance with an adjacency criterion, said skeletonizing being performed in cycles, the position of the character during skeletonizing being treated during a cycle in a regular and fixed sequence, said method comprising the steps of:

A. machine marking character positions which are situated at an edge of the character in accordance with an edge criterion in a first sub-cycle of a cycle by associating additional information with information of those character positions;

B. first testing by the use of a machine, each of the so-marked character positions in a second subcycle against a first indispensability criterion to determine whether to remove or maintain said character position; and C. machine testing a maintained character position in a third sub-cycle in which the character positions removed in the second sub-cycle appear as background positions against a second indispensability criterion to remove or maintain the character position.

2. A method as claimed in claim 1, wherein only those marked character positions are maintained after testing against the first indispensability criterion whose removal would cause an interruption or a loop in the character, and only the character positions which project from the character in the way of an end point are removed after testing against the second indispensability criterion.

3. A method as claimed in claim 1, wherein the testing cycles are preceded by a smoothing cycle in which character positions which project from the character in accordance with a smoothing criterion are removed, and background positions which project into the character are changed into character positions, character positions which project from the character in accordance with a projection criterion being excluded from marking in the subsequent cycles.

4. A device for skeletonizing characters imaged on a carrier according to a two-dimensional regular pattern of positions comprising:

A detector and storage means associated therewith, said detector feeding information of the characters into said storage means so that the characters are stored as digital information of character positions and background positions, respectively;

skeletonizing means for receiving and changing information of character positions into those of background positions until the information of character positions have been reduced to information of character positions of skeleton characters whose stroke elements consist of a single series of character positions which succeed each other in accordance with an adjacency criterion, said skeletonizing means comprising a control unit associated with said storage means for controlling skeletonizing of said characters in cycles;

a first decision unit having therein an edge criterion for receiving, in a first sub-cycle of a cycle, at least the information of the character positions together with information of the positions neighboring said character positions, and adding information to the information of the character positions for which said edge criterion is satisfied;

means for testing said character-related information including said added information against first and second indispensability criteria, said means having therein a first indispensability criterion for receiving, in a second subcycle, the information of the character positions together with said added information and in which, if the edge criterion was satisfied for a character position, but the first indispensability criterion was not satisfied, the information of said character position can be changed into that of a background position while retaining said added information, and also having therein a second indispensability criterion for receiving, in a third sub-cycle, the information of the remaining character positions together with said added information and in which, if the edge criterion was satisfied but the second indispensability criterion was not satisfied, the information of said character position can be changed into that of a background position;

and means for supplying the information provided by said testing means to an output.

5. A device as claimed in claim 4 including smoothing cycle means, in accordance with a smoothing criterion, for removing character positions which project from the character, and background positions which project into the character are changed into character positions whereby character positions which project from the character in accordance with a projection criterion are excluded from marking in subsequent cycles.

* * * * *

UNITED STATES PATENT AND TRADEMARK OFFICE
CERTIFICATE OF CORRECTION

PATENT NO. : 3,940,737
DATED : February 24, 1976
INVENTOR(S) : MATTHIJS BEUN

It is certified that error appears in the above-identified patent and that said Letters Patent are hereby corrected as shown below:

Column 1, line 7, after "positions" delete "in this method"
          line 8, after "positions" insert --in this method--
          line 24, after "There" insert --,--

Column 3, line 15, "character" should be --characters--
          line 34, "subcycle" should be --sub-cycle--

Column 4, lines 36-50, [in the Chart], the last line should be corrected under the appropriate heading as shown below:

| Figure | Neigh-bours | Order | Neigh-bours | Order | Neigh-bours | Order |
|---|---|---|---|---|---|---|
| 16 | 4 | 4 | | | 8 | 0 |

Column 5, line 39, "regard" should be --regards--

Column 7, line 13, delete "formation"
          line 65, "imput" should be --inputs--
          line 67, "Noo" should be --MOO--

UNITED STATES PATENT AND TRADEMARK OFFICE
CERTIFICATE OF CORRECTION

PATENT NO. : 3,940,737
DATED : February 24, 1976
INVENTOR(S) : MATTHIJS BEUN

It is certified that error appears in the above-identified patent and that said Letters Patent are hereby corrected as shown below:

Column 8, line 14, after "again" insert --assumed--
line 45, "resistor" should be --transistor--
line 49, "plied" should be --plies--
lines 55-56, "deteriorated" should be --determined--

Column 9, line 1, after "OR-gate" insert --DO1--
line 48, "supplied" should be --supplies--

Claim 1, line 12, "position" should be --positions--

Claim 4, line 31, "subcycle" should be --sub-cycle--

Signed and Sealed this

Thirteenth Day of July 1976

[SEAL]

Attest:

RUTH C. MASON
Attesting Officer

C. MARSHALL DANN
Commissioner of Patents and Trademarks